(12) United States Patent
Jyrkkä

(10) Patent No.: US 6,917,604 B2
(45) Date of Patent: Jul. 12, 2005

(54) METHOD AND APPARATUS FOR PERFORMING NEIGHBOR CELL SIGNAL STRENGTH MEASUREMENTS FOR DISCONTINUOUSLY TRANSMITTING BROADCAST CARRIERS

(75) Inventor: Kari Jyrkkä, Oulu (FI)

(73) Assignee: Nokia Corporation, Espoo (FI)

( * ) Notice: Subject to any disclaimer, the term of this patent is extended or adjusted under 35 U.S.C. 154(b) by 861 days.

(21) Appl. No.: 09/884,678

(22) Filed: Jun. 20, 2001

(65) Prior Publication Data

US 2003/0026228 A1 Feb. 6, 2003

(51) Int. Cl.$^7$ ............................. H04B 7/212; H04J 4/00
(52) U.S. Cl. ..................... 370/337; 370/436; 455/67.11
(58) Field of Search ............................... 370/337, 338, 370/329, 436, 252, 350; 455/422.1, 450, 426.1, 67.11

(56) References Cited

U.S. PATENT DOCUMENTS

| | | | | |
|---|---|---|---|---|
| 6,594,250 B1 | * | 7/2003 | Silventoinen et al. | 370/347 |
| 6,594,252 B1 | * | 7/2003 | Barany et al. | 370/347 |
| 6,647,000 B1 | * | 11/2003 | Persson et al. | 370/330 |

OTHER PUBLICATIONS

"Digital Cellular Telecommunications System (Phase 2+); Multiplexing and Multiple Access on the Radio Path"; GSM 05.02 version 8.3.0); 1999.

* cited by examiner

Primary Examiner—Duc Ho
(74) Attorney, Agent, or Firm—Harrington & Smith LLP

(57) ABSTRACT

A method is disclosed for operating a mobile station in a Compact packet transfer mode with discontinuously transmitting neighbor cell control channel carriers, as is a mobile station that operates in accordance with the method. The method features, when operating in a Traffic mode, and during Traffic frames, determining if the transmitter is off and, if it is, tuning a frequency source during the unused transmit timeslot for receiving a channel from a neighbor cell to make a measurement, or if the neighbor cell is on the same frequency as the serving cell frequency, making the neighbor cell measurement without retuning the frequency source. The method further features, during Traffic mode Idle frames, making at least four neighbor cell measurements per 52-multiframe. The neighbor cell control channels include a Broadcast Control Channel (BCCH) and a Compact Packet Broadcast Control Channel (CPBCCH). The frequency source may be a conventional GSM frequency synthesizer having a settling time in the range of about 500 microseconds to about 600 microseconds.

7 Claims, 4 Drawing Sheets

METHOD AND APPARATUS FOR PERFORMING NEIGHBOR CELL SIGNAL STRENGTH MEASUREMENTS FOR DISCONTINUOUSLY TRANSMITTING BROADCAST CARRIERS

FIELD OF THE INVENTION

These teachings relate generally to cellular wireless telecommunications systems and methods and, more particularly, relates to techniques for a mobile station, which may also be referred to as a wireless or mobile terminal, to make signal strength measurements of neighboring cell transmissions.

BACKGROUND OF THE INVENTION

Modern wireless telecommunications systems are evolving to provide high speed packet data services for users of mobile equipment. One example is an ability to provide internet access to a user of mobile equipment. One wireless system that is rapidly evolving in this direction is a Time Division, Multiple Access (TDMA) system known as the Global System for Mobile Communication (GSM), in particular enhanced versions of GSM known as GSM+, GPRS (General Packet Radio Services) and EGPRS (Enhanced General Packet Radio Services).

A new mode of operation, referred to as the Compact Mode (Compact), was specified for GSM Release 99 (R-99). Compact is a radio interface mode for inter-cell synchronized systems, wherein the mapping of control channels for up to four cells is done on the same carrier, and where control channel separation is achieved by transmitting control in different cells on different timeslots. The mapping of the control channels has been specified in a document entitled 3GPP TS 05.02. A Compact Packet Broadcast Control Channel (CPBCCH) is specified to be transmitted with constant RF output power on at least four radio blocks per multiframe on a serving time group.

The Compact Mode thus introduces a discontinuously transmitting broadcast control channel. The use of discontinuous transmission on the broadcast control channels, with a synchronous inter-cell wireless network, enables a GSM network deployment using only 1 MHz of bandwidth, as opposed to the currently specified 2.5 MHz of bandwidth that use continuously transmitting control channels. The new (discontinuously transmitting) control channel for the Compact Mode was specified for IS136+EGPRS systems so that current IS136 system operators could deploy a new EGPRS radio system with a minimum initial spectrum allocation.

As may be appreciated, the introduction of the discontinuously transmitting control channels requires modifications to be made to the existing implementations of mobile stations. These changes relate to the initial scanning for the discontinuously transmitting control channels, synchronization to the discontinuously transmitting control channels, and the performance of neighbor cell measurements using the discontinuously transmitting control channels.

One particular problem that is introduced by the adoption of the Compact Mode relates to the operation of frequency synthesizer of the mobile station. The frequency synthesizer is a programmable frequency generator used for tuning between the transmission and reception frequencies over bands of transmission and reception frequencies. It can be shown that the use of the Compact Mode, where the mobile station is required to make a neighbor cell Compact Mode channel measurement (when operating in a Traffic mode as opposed to an Idle mode) requires that the frequency synthesizer exhibit a maximum settling time of about 250 microseconds. Contrasting this requirement with the current GSM synthesizer settling times in the range of about 500 microseconds to about 600 microseconds, it can be appreciated that the synthesizer operational characteristics are much more stringent.

GSM 05.08, chapter 12.4.1.2 (Packet Transfer Mode) states that while in the packet transfer mode the mobile station must continuously monitor all Broadcast Control Channel (BCCH) or CPBCCH carriers as indicated by a BA (GPRS) list, as well as the broadcast carrier of the serving cell. In every TDMA frame possible, a received signal level measurement sample must be taken on at least one of the BCCH or CPBCCH carriers, as evenly distributed as possible amongst the neighbor cells. For CPBCCH carriers, only the TDMA frames where common control or broadcast blocks are transmitted are used for monitoring signal levels.

This implies that no matter what the traffic time slot allocation to a particular mobile station, the mobile station is expected to take at least one receive (RX) level sample from a neighbor cell signal in every TDMA frame. In order to comply with this requirement the mobile station requires a fast (250 microsecond) synthesizer. For example, when operating with multislot class 6 (i.e., a capability to receive three slots (3 RX) and transmit in another slot (1 TX) during a single frame, which in GSM contains 8 time slots), the mobile station's frequency synthesizer must exhibit a maximum settling time of 250 microseconds.

Reference in this regard can be had to FIG. 1, which shows two consecutive GSM frames, wherein the Compact Mode transmissions occur only during timeslots 1, 3, 5 and 7 (the even times lots 0, 2, 4 and 6 could be used instead). FIG. 1 also assumes the mobile station is operating multislot class 6. Since the mobile station must make 3 RX and 1 TX during a single frame, then the mobile station is capable of "seeing" a neighbor cell signal only in timeslot positions 5 and 7. However, since the mobile station must receive its first RX timeslot immediately following timeslot 7, due to synthesizer tuning and settling times, it is not desirable to attempt to make a neighbor cell measurement during timeslot 7. Instead, all of timeslot 7 should preferably be reserved for settling the frequency synthesizer in order to accurately receive the transmission in timeslot 0 of the next frame. As such, only timeslot 5 is available for making a neighbor measurement when using the illustrated timeslot traffic allocation. In this case the synthesizer settling time must begin immediately after the timeslot 4 TX has ended. The synthesizer must be settled within 250 microseconds in order to be able to adjust the automatic gain control (AGC) and take a 32-bit analog to digital converter (ADC) RX-level sample before the end of timeslot 5. More specifically, assuming that the AGC adjustment requires 7*8=56 GSM bit times, and the actual RX-level sampling requires 32 GSM bit times, what remains for the synthesizer settling time from a single 156 bit GSM burst (timeslot) is 156−56−32=68 GSM bit times, which corresponds to 250 microseconds.

The foregoing problem does not exist in the conventional GSM network, since all of the control channel carriers are constantly transmitting. As such, the mobile station may make neighbor cell measurements at any point in a TDMA frame. However, since the neighbor cells in the Compact Mode are transmitting only during every other timeslot (e.g., 1, 3, 5 and 7), the timing of neighbor cell measurements must be made quite precisely.

SUMMARY OF THE INVENTION

The foregoing and other problems are overcome by methods and apparatus in accordance with embodiments of these teachings.

These teachings enable neighbor cell measurements to be made from discontinuous, but periodically transmitting neighbor cells, without requiring the use of a frequency synthesizer having a fast settling time. The neighbor cell measurements are enabled to occur even when the mobile station is involved in a full duplex connection, i.e., one wherein it is required to receive and transmit in the same GSM TDMA frame.

These teachings exploit to advantage the knowledge that GPRS packet traffic is generally asymmetric with respect to the use of the uplink (mobile station to base station) and the downlink (base station to mobile station), and that TX operations are not typically required in every TDMA frame. In addition, these teachings exploit the knowledge that in the Compact Mode there are generally but a few neighbor frequencies. As such, the neighbor cell measurement frequency may be same as the serving cell receive frequency, meaning that the synthesizer is not required to be retuned and settled to make neighbor cell measurements. Furthermore, the preferred embodiment concentrates the neighbor cell measurements during GSM IDLE frames, when serving cell RX and TX operations are not required.

A method is thus disclosed for operating a mobile station in a Compact packet transfer mode with discontinuously transmitting neighbor cell control channel carriers, as is a mobile station that operates in accordance with the method. The method features, when operating in a Traffic mode, and during Traffic frames, determining if the transmitter is off and, if it is, tuning a frequency source during the unused transmit timeslot for receiving a channel from a neighbor cell to make a measurement, or if the neighbor cell is on the same frequency as the serving cell frequency, making the neighbor cell measurement without tuning the frequency source. The method further features, during Traffic mode Idle frames, making at least four neighbor cell measurements per 52-multiframe. The neighbor cell control channels include a Broadcast Control Channel (BCCH) and a Compact Packet Broadcast Control Channel (CPBCCH). The frequency source may be a conventional GSM frequency synthesizer having a settling time in the range of about 500 microseconds to about 600 microseconds.

BRIEF DESCRIPTION OF THE DRAWINGS

The above set forth and other features of these teachings are made more apparent in the ensuing Detailed Description of the Invention when read in conjunction with the attached Drawings, wherein:

FIG. 3 depicts RX-level measurement timing with different traffic allocations relative to the occurrence of an IDLE frame; and FIG. 4 depicts Compact Mode measurement timing during traffic at Compact control blocks.

DETAILED DESCRIPTION OF THE PREFERRED EMBODIMENTS

Figure 1:
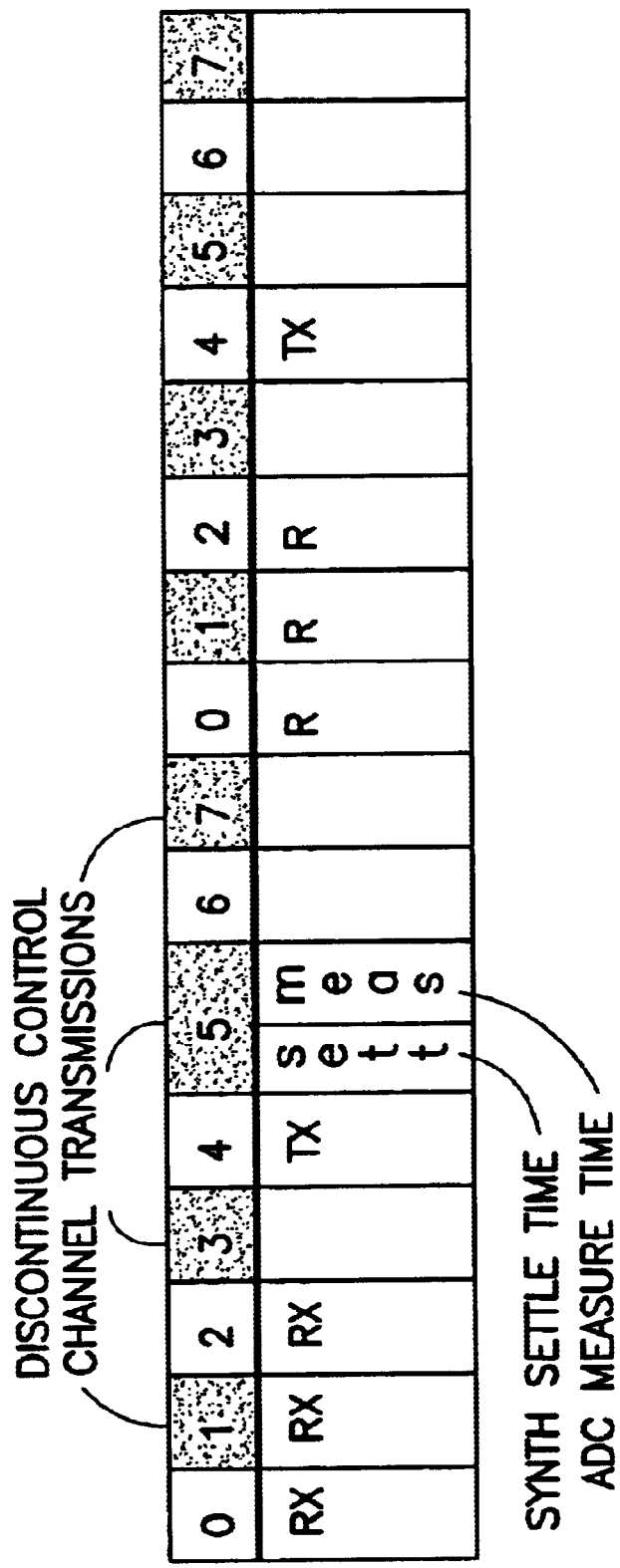
FIG. 1 is diagram showing two consecutive GSM frames, where Compact Mode control channel transmissions discontinuously occur in only timeslots 1, 3, 5 and 7, and wherein a mobile station is operating in the multislot class 6 mode of operation.
Figure 2:
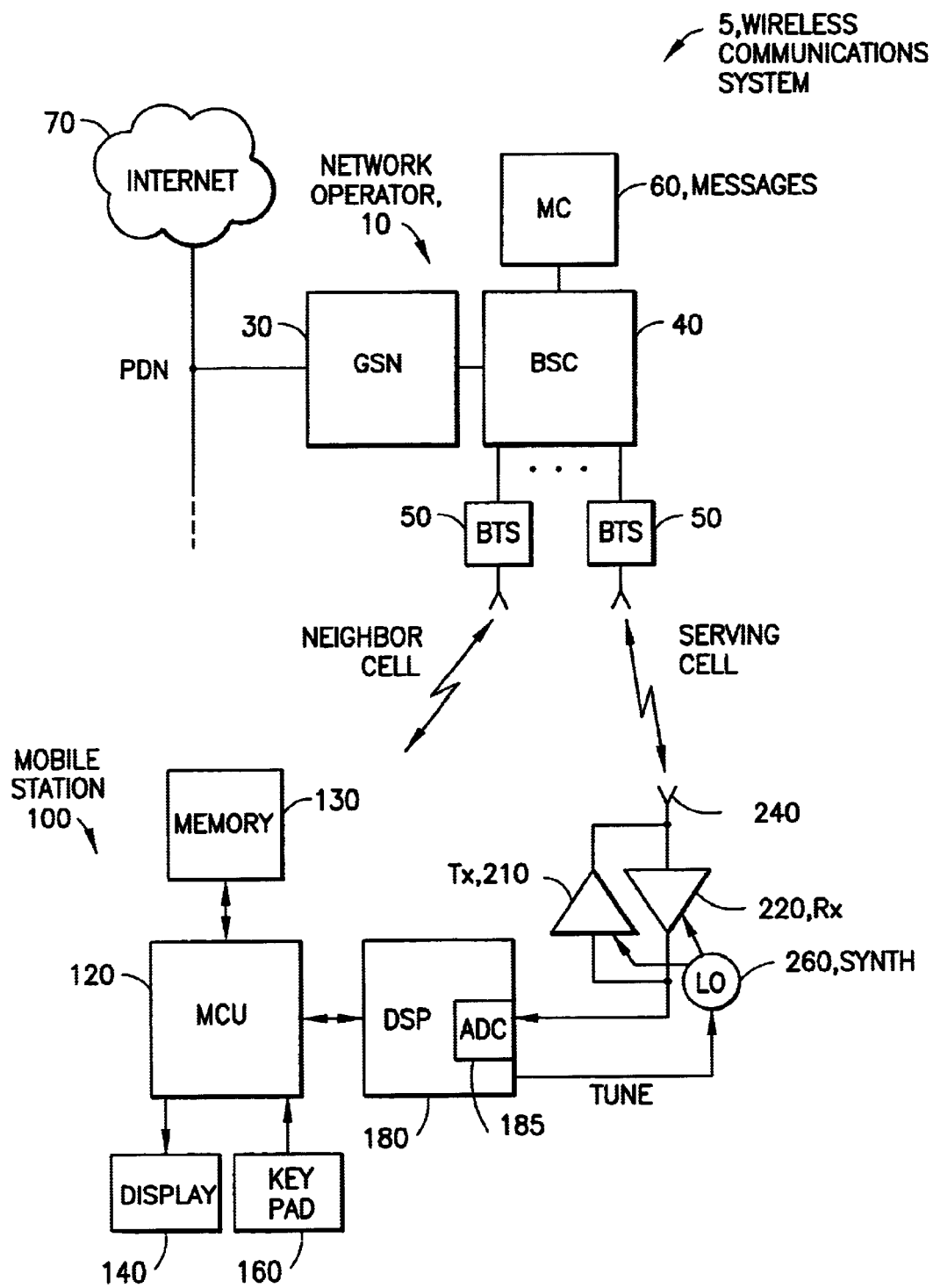
FIG. 2 is a block diagram of a GPRS GSM wireless communication system that is useful for explaining the operation of these teachings.

Referring to FIG. 2, there is illustrated a simplified block diagram of an embodiment of a wireless communications system 5 that is suitable for practicing these teachings. The wireless communications system 5 includes at least one mobile station (MS) 100. The MS 100 may be embodied as a handheld cellular telephone, a vehicle-installed cellular telephone, a personal communication device, a personal data assistant (PDA) device having wireless communication capabilities, a wireless communication module installable within or with a computer, such as a PCMCIA or similar type of card or module that is installed during use within a portable data processor, such as a laptop or notebook computer, or even a computer that is wearable by the user. In general, the MS 100 may be any device capable of bidirectional communication with a wireless network.

FIG. 2 also shows an exemplary network operator 10 having, for example, a GPRS Support Node (GSN) 30 for connecting to a telecommunications network, such as a Public Packet Data Network or PDN. The GPRS, or General Packet Radio Service, is a GSM phase 2+ service in which radio resources for data transfer are allocated on a per block basis, as opposed to a circuit-switched basis. The network operator 10 also includes at least one base station controller (BSC) 40, as well as a plurality of base transceiver stations (BTS) 50 that transmit in a forward or downlink direction both physical and logical channels to the mobile station 100 in accordance with the predetermined air interface standard. A reverse or uplink communication path also exists from the mobile station 100 to the network operator, and conveys mobile originated access requests and traffic.

Each BTS 50 is assumed to support a cell. The BTS 50 through which the MS 100 is currently receiving service is considered to be the serving cell BTS, while at least one other BTS 50 is assumed to be supporting a neighboring cell from which the MS 100 is required to periodically make RF signal measurements, as was described above.

The air interface standard can conform to any standard that enables packet data transmissions to occur to and from the mobile station 100, such as packet data transmissions enabling Internet 70 access and web page downloads. In the presently preferred embodiment of these teachings the air interface standard is the Time Division Multiple Access (TDMA) air interface that supports a GSM or an advanced GSM protocol and air interface, although these teachings are not intended to be limited solely to GSM or GSM-related wireless systems.

The network operator 10 may also include a Message Center (MC) 60 that receives and forwards messages for the mobile stations 100. Other types of messaging service may include Supplementary Data Services and one under currently development and known as Multimedia Messaging Service (MMS), wherein image messages, video messages, audio messages, text messages, executables and the like, and combinations thereof, can be transferred between the network and the mobile station 100.

The mobile station 100 typically includes a microcontrol unit (MCU) 120 having an output coupled to an input of a display 140 and an input coupled to an output of a keyboard or keypad 160. The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120, in cooperation with a DSP 180 described below, to execute the software routines, layers and protocols required to implement the Compact Mode neighbor cell measurement techniques in accordance with the teachings herein, as well as to provide a suitable user interface (UI), via display 140 and keypad 160, with a user. Although not shown, a microphone and speaker are typically provided for enabling the user to conduct voice calls in a conventional manner.

The mobile station 100 also contains a wireless section that includes the digital signal processor (DSP) 180, or equivalent high speed processor, as well as a wireless transceiver that includes a transmitter 200 and a receiver 220, both of which are coupled to an antenna 240 for communication with the network operator. The DSP 180 may implement, or receive an input from, an ADC 185 used for digitizing received signal level samples of neighbor and same cell control channel transmissions. At least one local oscillator (LO) 260, such as a frequency synthesizer, is provided for tuning the transceiver. The receiver 220 could be a direct conversion receiver, or a heterodyne-type receiver using an Intermediate Frequency (IF). Data, such as packet data, is transmitted and received through the antenna 240. The following discussion pertains most particularly to the receiver 220, as well as to the operation of the DSP 180 in implementing the presently preferred embodiment of the Compact Mode neighbor cell measurement capabilities in accordance with these teachings.

In that the Compact control channel transmissions are specified to occur in certain TDMA frames and in certain timeslots of those frames, a requirement exists to accurately time the operation of the MS 100 to make neighbor cell measurements. In order to avoid the need to provide a fast, and hence more complex, costly and power consuming, synthesizer 260, it is preferred that three neighbor cell RX-level samples be taken from Compact neighbor cells in the two Idle frames of the 52 frame multiframe specified for GSM. In this manner the MS 100 can obtain at least some RX-level samples from all neighbor cells when in the Traffic mode, regardless of the Traffic mode timeslot allocation to the MS 100. Traffic mode is considered herein to be a mode where the MS 100 is actively engaged in at least one of transmitting or receiving data packets during assigned timeslot(s).

During the Traffic mode there are two Idle frames in a 52 frame multi-frame. Thus, there are two methods, in accordance with these teachings, to making the desired measurements. In a first method, and during a Traffic frame, the DSP 180 determines if the transmitter 210 is off, or if the neighbor cell is on the same frequency as the RX/TX during the frame. In this case the DSP 180 may measure the compact neighbor channel using the slow frequency synthesizer 260. In a second method, during Traffic mode Idle frames (when the DSP 180 is not required to transmit to or receive from the serving cell), the DSP 180 may make more than one compact neighbor cell measurement.

The RX-level measurements can be more readily obtained when the first RX slot of the Traffic allocation is an odd timeslot. In this case the synthesizer 260 is tuned immediately after the TX slot, and there is one slot time for the tuning to occur before ADC sampling is initiated to make the neighbor RX-level measurement.

The more difficult case is where the first RX slot of the Traffic allocation is an even timeslot, since the Compact neighbor transmits immediately after the TX timeslot. In this case the DSP 180 makes the Compact neighbor channel measurement only if (a) the MS 100 TX is not On for that timeslot, or (b) if the Compact neighbor control channel is transmitted on the same frequency as the MS 100 TX/RX frequency (thereby eliminating the requirement to retune the receiver 220 using the synthesizer 260.)

During an Idle frame the MS 100 RX always occurs in an odd timeslot, since the Compact control channel transmits only in the odd timeslots 1, 3, 5 and 7. In addition, the MS 100 TX is rarely On in the Idle mode, so that most of the time the three neighbor RX-level measurements can be obtained from the Compact carriers.

Figure 3:
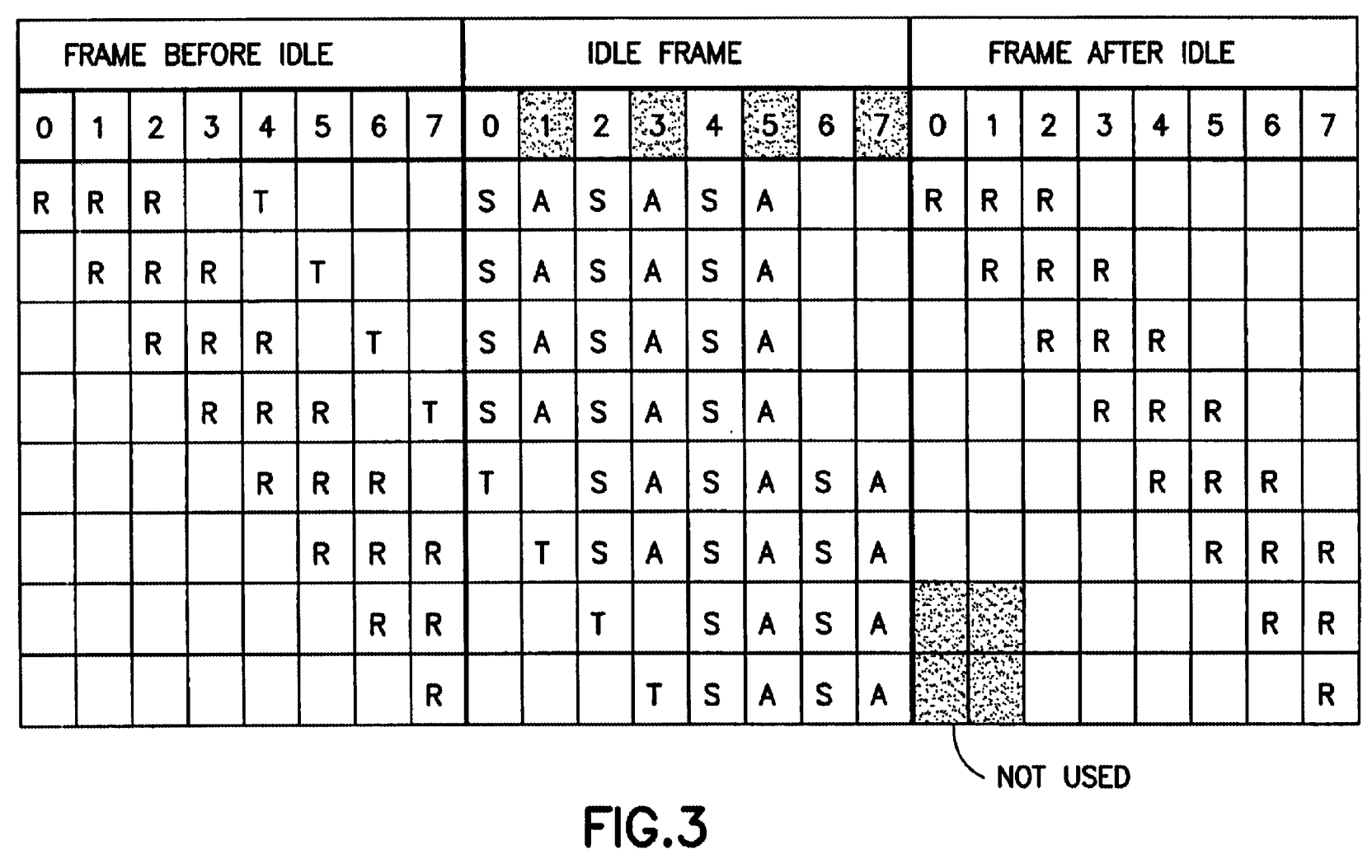

FIG. 3 depicts RX-level measurement timing with different MS 100 Traffic timeslot allocations relative to the occurrence of a GSM IDLE frame. In FIG. 3 R indicates that the MS 100 RX begins at the start of the timeslot, T indicates that MS 100 TX begins at the start of the timeslot, S indicates the timeslot during which the synthesizer 260 is loaded with the frequency of the Compact neighbor cell at the start of the timeslot and A indicates that the operation of the ADC is started at the beginning of the timeslot.

Note that the three consecutive RX slots terminate during the Idle frame if not completed (i.e., if the first Traffic allocation is timeslot 6 or timeslot 7, while the MS 100 TX timeslot allocation continues during the Idle frame.) With timeslots 6 and 7 the last of the three RX-level measurements is not valid, since it continues to the next TDMA frame. The Idle frame that transmits the Compact Frequency Correction Channel (CFCH) burst (Frame Number (FN) mod 52=25) is always solely reserved for neighbor cell RX-level measurements. The Idle frame that transmits the Compact Synchronization Channel (CSCH) burst (FN mode 52=51) may be used for CSCH burst reception. However, only the first of the three measurements slot times is preferably reserved for receiving the CSCH burst.

The Compact Frequency Correction Channel (CFCH) is defined as a GSM burst modulated with a sine wave 67 kHz above the carrier frequency. The Compact Synchronization Channel (CSCH) is defined as a GSM burst that conveys the Compact-specific training sequence and data contents. When the mobile station 100 decodes the data content it is enabled to resolve the Compact control channel time group, timeslot and absolute TDMA frame number that the cell transmits. These channels and bursts are defined in GSM 05.02.

In the illustrated embodiment of FIG. 3 it can be seen that the settling of the synthesizer 260 occurs after 8 timeslots when timeslot 0 is the first Traffic allocation, that the settling of the synthesizer 260 occurs after 7 timeslots when timeslot 1 is the first Traffic mode allocation, that the settling of the synthesizer 260 occurs after 6 timeslots when timeslot 2, 4, or 6 is the first Traffic allocation, and that the settling of the synthesizer 260 occurs after 5 timeslots when timeslot 3, 5, or 7 is the first Traffic allocation.

Figure 4:
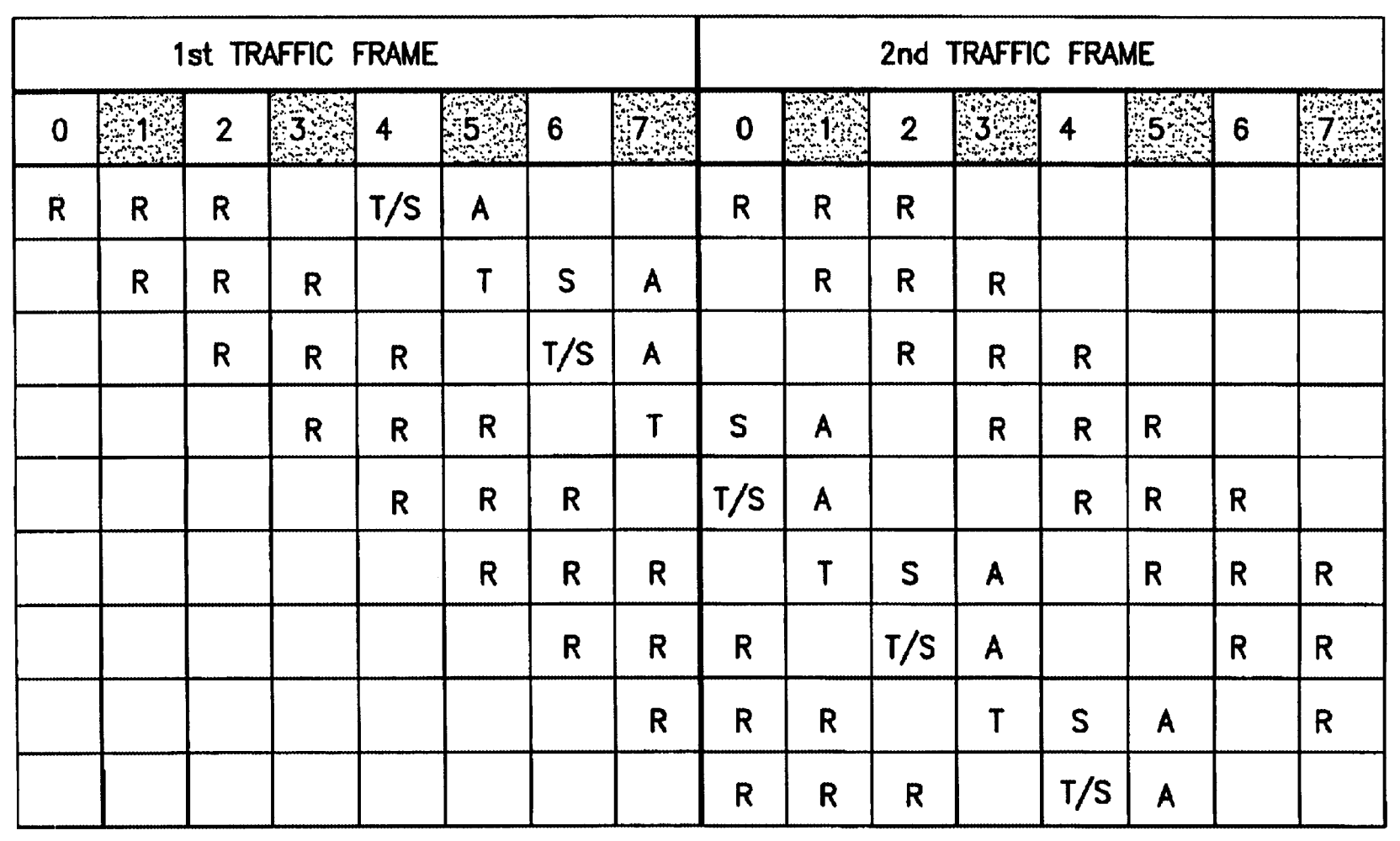

FIG. 4 depicts the Compact measurement timing during the Traffic mode at Compact control blocks, and R, T, S and A are as were defined above for FIG. 3. Note that in this case, and for even first RX timeslot allocations (0, 2, 4, 6), the operation of the synthesizer 260 for Compact neighbor cell monitoring is always initiated 4 timeslots after the first RX timeslot, and ADC 185 samples are taken 5 timeslots after the first RX timeslot, while for the odd first RX timeslot allocations (1, 3, 5, 7), the operation of the synthesizer 260 for Compact neighbor cell monitoring is always initiated 5 timeslots after the first RX timeslot, and ADC 185 samples are taken 6 timeslots after the first RX timeslot. For those timeslots designated as T/S the synthesizer 260 is loaded with the desired neighbor cell RX frequency only if the TX timeslot is not required. If the TX timeslot is required, the measurement may still be taken, but only if the neighbor cell RX frequency to be monitored is the same frequency as the RX Traffic frequency allocated to the MS 100.

It is important to note that the measurement scheme depicted in FIGS. 3 and 4 greatly relaxes the demands on the synthesizer 260, as it does not require a maximum settling time that is less than that required for conventional GSM operation (i.e., about 500 microseconds to about 600 microseconds.) That is, a "slow" synthesizer 260 can be employed.

What follows is exemplary pseudocode that describes the operation of the DSP 180 in executing the Compact neighbor cell measurements in accordance with FIGS. 3 and 4.

```
IF (Traffic channel)
    IF (Compact control block ON during TDMA frame)
        IF (First RX slot is an even timeslot)
            IF (TX ON in the current TDMA frame)
                IF (neighbor frequency==own RX frequency)
                    Measure with ADC 185 timed immediately
                    after TX slot (synthesizer 260 is not tuned)
                ELSE (neighbor frequency not == to own RX
                    frequency)
                    Compact neighbor cell monitoring not
                    performed (conventional monitoring is done
                    instead)
            ELSE (TX not ON in the current TDMA frame)
                Measure with ADC 185 timed immediately after
                TX slot and tune synthesizer with TX slot timing
            END
        ELSE (first RX slot is an odd timeslot)
            Measure with ADC 185 timed one slot after TX slot and
            tune synthesizer 260 immediately after TX slot
        END
    ELSE IF (NOT Compact control block time but last TDMA frame
    before IDLE)
        Extend the last TDMA frame before IDLE to 2 TDMA frames
        and make 3 RX-level measurements with the following timings:
        RX=timeslot 0 → synthesizer settling RX+8, RX+10, RX+12;
        RX=timeslot 1 → synthesizer settling RX+7, RX+9, RX+11;
        RX=timeslots 2,4,6 → synthesizer settling RX+6, RX+8,
            RX+10;
        RX=timeslots 3,5,7 → synthesizer settling RX+5, RX+7, RX+9;
        ADC 185 samples are taken 1 timeslot after synthesizer settling
        time
    ELSE (NOT Compact control block and NOT frame before IDLE)
        Perform conventional GSM neighbor cell monitoring
    END (Traffic channel)
```

It can be appreciated that the above techniques may be employed as well when the control channel is measured, although the significantly more available Idle time makes these Idle frame measurements much simpler than the Traffic mode case of most concern to these teachings.

It can be further appreciated that these teachings extend and enhance Clause 12 (COMPACT Mode Tasks) of the proposed specification for the 3GPP document, in particular Sub-Clause 12.4.1.2 (Packet transfer mode). In this sub-clause the MS 100 is specified, while in the packet transfer mode, to continuously monitor all BCCH and CPBCCH carriers as indicated by the neighbor list transmitted from each base station, as well as the broadcast carrier of the serving cell. In the case of the Compact control channel, it is not sufficient to only broadcast a frequency list, but the time group must be specified as well. The time group specifies the timeslot during which the base station transmits control information. These time groups are 0,1,2,3, corresponding to timeslots 1,3,5,7, respectively. In every TDMA frame possible, a received signal level measurement sample must be taken on at least one of the BCCH carriers or the CPBCCH time groups. These teachings extend this to have the samples taken one after another, as evenly distributed as possible among the neighbor cells. Further in accordance with these teachings, and as an exception for those CPBCCH carriers on multislot allocations, the MS 100 takes at least four received signal level measurement samples for CPBCCH carriers from two different time groups (two samples per time group) in every 52 multiframe, as evenly distributed as possible among the neighbor cells.

These teachings make Compact neighbor channel measurements possible during the Traffic mode with normal (slow) settings of the synthesizer 260. While GSM 05.02 multislot classes specify times that are allowed for neighbor cell measurements with different multislot capabilities, in accordance with these teachings there is no need to specify or require faster neighbor cell measurements. During Traffic mode Idle frames (two per 52-multiframe) the mobile station 100 is enabled to receive at least two Compact neighbor channels, regardless of the traffic allocation or the multislot class. In that there are two Idle frames within the 52-multiframe, there may be at least four RX-level measurements per 52-multiframe.

During normal Traffic mode frames these teachings provide two methods to handle the situation where the neighbor cell measurement must be taken immediately after or before the serving cell TX or RX timeslot. The first method determines if the TX is off, in the case of GPRS traffic, while the second method determines if the neighbor cell frequency is the same as the serving cell RX/TX frequency during the frame. In the first method the (unused) TX timeslot is employed to tune the synthesizer 260, while in the second method tuning is not required, as the synthesizer 260 is already tuned to the correct frequency.

While these teachings have been particularly shown and described with respect to preferred embodiments thereof, it will be understood by those skilled in the art that changes in form and details may be made therein without departing from the scope and spirit of these teachings.

What is claimed is:

1. A method for operating a mobile station in a TDMA packet transfer mode with discontinuously transmitting neighbor cell control channel carriers, comprising steps of:
   monitoring neighbor cell control channel carriers during TDMA frames by taking a received signal level measurement sample on at least one of the neighbor cell control channel carriers; and
   for those control channel carriers on multislot allocations, when in a Traffic mode, taking at least four received signal level measurement samples per 52-multiframe, regardless of multislot class and traffic allocation.

2. A method for operating a mobile station in a Compact packet transfer mode with discontinuously transmitting neighbor cell control channels, comprising steps of:
   when operating in a Traffic mode, and during Traffic frames, determining if the transmitter is off and, if it is, tuning a frequency source during the unused transmit timeslot for receiving a channel from a neighbor cell to make a measurement, or
   if the neighbor cell is on the same frequency as the serving cell frequency, making the neighbor cell measurement without tuning the frequency source; and
   during Traffic mode Idle frames, making at least four neighbor cell measurements per 52-multiframe.

3. A method as in claim 2, wherein the neighbor cell control channels comprise a Broadcast Control Channel (BCCH) and a Compact Packet Broadcast Control Channel (CPBCCH).

4. A method as in claim 2, wherein the frequency source is comprised of a GSM frequency synthesizer having a settling time in the range of about 500 microseconds to about 600 microseconds.

5. A mobile station comprising an RF transmitter and an RF receiver that are tuned with a frequency synthesizer, and a data processor that is responsive to a stored program for operating said mobile station in a Compact packet transfer mode with discontinuously transmitting neighbor cell control channel carriers, said stored program directing the operation of said data processor, when operating in a Traffic mode during Traffic frames, to determine if the RF transmitter is off and, if it is, tuning said frequency synthesizer during the unused transmit timeslot for receiving a channel from a neighbor cell to make a measurement, or if the neighbor cell is on the same frequency as the serving cell frequency, making the neighbor cell measurement without tuning the frequency synthesizer, and during Traffic mode Idle frames, making at least four neighbor cell measurements per 52-multiframe.

6. A mobile station as in claim 5, wherein neighbor cell control channels comprise a Broadcast Control Channel (BCCH) carrier and a Compact Packet Broadcast Control Channel (CPBCCH) carrier.

7. A mobile station as in claim 5, wherein said frequency synthesizer has a settling time in the range of about 500 microseconds to about 600 microseconds.

* * * * *